US010040369B2

(12) United States Patent
Hughes et al.

(10) Patent No.: US 10,040,369 B2
(45) Date of Patent: Aug. 7, 2018

(54) COOLING SYSTEM FOR VEHICLE DEVICE (71) Applicant: JAGUAR LAND ROVER LIMITED, Whitley, Coventry (GB)

(72) Inventors: Ian Hughes, Coventry (GB); Baptiste Bureau, Coventry (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 0 days.

(21) Appl. No.: 15/312,235

(22) PCT Filed: May 20, 2015

(86) PCT No.: PCT/EP2015/061110
§ 371 (c)(1),
(2) Date: Nov. 18, 2016

(87) PCT Pub. No.: WO2015/177210
PCT Pub. Date: Nov. 26, 2015

(65) Prior Publication Data
US 2017/0080821 A1    Mar. 23, 2017

(30) Foreign Application Priority Data
May 20, 2014    (GB) .................................. 1408913.0

(51) Int. Cl.
*B60L 9/00*     (2006.01)
*B60L 11/18*    (2006.01)
(Continued)

(52) U.S. Cl.
CPC ....... *B60L 11/1874* (2013.01); *B60L 11/1872* (2013.01); *B60W 20/00* (2013.01);
(Continued)

(58) Field of Classification Search
USPC ......................................................... 701/22
See application file for complete search history.

(56) References Cited

U.S. PATENT DOCUMENTS 5,305,613 A      4/1994  Hotta et al.
7,971,447 B2 *   7/2011  Maitre ............... B60H 1/00278
                                                        165/104.11
(Continued)

FOREIGN PATENT DOCUMENTS

GB      201408913    *  7/2014  .......... H01M 10/613

OTHER PUBLICATIONS

International Search Report and Written Opinion of the International Searching Authority for International application No. PCT/EP2015/061110 dated Aug. 5, 2015.
(Continued)

*Primary Examiner* — Tyler D Paige (57) ABSTRACT

A cooling system for cooling a device (150), e.g. a battery, within a vehicle (100), especially a hybrid electric vehicle, the cooling system comprising: a first cooling subsystem (180) for cooling the device (150) and having a relatively low rate of energy consumption, e.g. an ambient air-based cooling apparatus, a second cooling subsystem (182) for cooling the device (150) and having a relatively high rate of energy consumption, e.g. a refrigeration-based cooling apparatus, evaluation means (190P, 190R) comprising predictive evaluation means (190P) for providing a predictive output responsive to a determination whether a temperature of the device (150) will exceed a first prescribed threshold value within a prescribed period of time, an evaluation output of the evaluation means (190P, 190R) being dependent on at least the predictive output of the predictive evaluation means (190P), assessment means (190A) for providing an assessment output responsive to a determination whether the temperature of the device (150) is lowerable by the first cooling subsystem (180) alone, and control means for selectively controlling actuation of the first cooling subsystem (180) or the second cooling subsystem (182) in dependence on the evaluation output of the evaluation
(Continued)

means (190P, 190R) and the assessment output of the assessment means (190A). By use of the combined evaluation methodology to operate the lower-energy cooling subsystem (180) in a pre-emptive manner, before or unless the higher-energy cooling subsystem (182) is actually needed, a more energy efficient system is achieved.

22 Claims, 2 Drawing Sheets (51) Int. Cl.
  *H01M 10/613* (2014.01)
  *H01M 10/625* (2014.01)
  *H01M 10/633* (2014.01)
  *B60W 20/00* (2016.01)

(52) U.S. Cl.
  CPC ....... *H01M 10/613* (2015.04); *H01M 10/625* (2015.04); *H01M 10/633* (2015.04); *B60L 2240/545* (2013.01); *B60L 2260/56* (2013.01); *H01M 2220/20* (2013.01); *Y02T 10/7005* (2013.01); *Y02T 10/705* (2013.01); *Y10S 903/907* (2013.01)

(56) References Cited

U.S. PATENT DOCUMENTS

| | | | |
|---|---|---|---|
| 2010/0019729 A1 | 1/2010 | Kaita et al. | |
| 2010/0089547 A1* | 4/2010 | King | B60L 3/0046 165/42 |
| 2012/0082871 A1 | 4/2012 | Simonini et al. | |
| 2012/0158228 A1 | 6/2012 | Biondo et al. | |
| 2012/0222438 A1 | 9/2012 | Osaka et al. | |
| 2015/0257303 A1* | 9/2015 | Shedd | F25B 41/00 62/62 |
| 2017/0072813 A1* | 3/2017 | Martin | B60L 11/1874 |
| 2017/0080821 A1* | 3/2017 | Hughes | H01M 10/613 |

OTHER PUBLICATIONS

Combined Search and Examination Report under Sections 17 and 18(3) for Application No. GB1508632.5 dated Nov. 18, 2015.
Combined Search and Examination Report under Sections 17 and 18(3) for Application No. GB1408913.0 dated Dec. 1, 2014.

* cited by examiner

COOLING SYSTEM FOR VEHICLE DEVICE

TECHNICAL FIELD

The present invention relates to a cooling system for cooling a device within a vehicle. Some embodiments of the invention relate especially, though not essentially, to a cooling system for cooling a vehicle charge storage device such as a battery. Some embodiments of the invention are applicable in particular, though not exclusively, to the cooling of batteries of electric or hybrid electric vehicles.

BACKGROUND

Hybrid electric vehicles having an internal combustion engine and an electrical propulsion motor each operable to provide drive torque to drive the vehicle, alone or in combination, are well-known. The propulsion motor is powered by a high voltage (HV) propulsion battery. The vehicle may be operated in an electric vehicle (EV) mode in which the engine is switched off and the electrical propulsion motor provides drive torque to drive the vehicle as required. The vehicle may also be operated in a parallel mode in which the engine is switched on and the electrical propulsion motor is operable either to provide drive torque in addition to the engine, in a parallel boost mode, or to generate electrical charge to recharge the propulsion battery, in a parallel recharge mode. A vehicle control system determines when to switch the internal combustion engine on or off, and when to open or close a clutch between the engine and a transmission. In some vehicles the electric propulsion motor is integrated into the transmission.

Also known are various vehicles which are exclusively electrically driven, in which an electrical propulsion motor alone provides the drive torque to drive the vehicle, the motor being powered by a HV propulsion battery which is rechargeable as or when required, for example at a recharging station.

Many examples of batteries used in known electric or hybrid electric vehicles generally require their internal temperature to be maintained within a carefully controlled temperature range in order to provide optimum performance and, especially, to be able to undergo charging or recharging at optimum efficiency. Exposure of such batteries to extremes of temperature also significantly reduces battery life, which therefore increases long term costs to the consumer. For this reason such batteries generally require some kind of dedicated cooling system which may be actuated as or when required in order to maintain the battery temperature at a desired level during, prior to and/or after operation of the vehicle. Such battery cooling systems are generally powered from the battery itself, or some other on-board charge storage device.

However, such battery cooling systems tend to be relatively power-hungry and use a relatively large amount of energy to run. For example, they generally employ devices such as pumps, fans and/or compressors, all of which have relatively high rates of energy consumption.

It is increasingly important to seek to limit unnecessary energy wastage in the automotive field. Furthermore reductions in electrical energy used by vehicle systems can enable a reduction in battery size, increased battery lifespan, and, in the case of electric vehicles or hybrid electric vehicles, increased range of the vehicle and improved fuel economy.

SUMMARY

Embodiments of the invention may be understood with reference to the appended claims.

Aspects of the present invention provide a cooling system, a controller for controlling a cooling system, a vehicle, a method of controlling a cooling system, a method of cooling a device within a vehicle, a computer readable medium, a carrier medium, a computer program product, or a processor.

In an aspect of the invention there is provided a cooling system for cooling a device within a vehicle, the cooling system comprising:
  a first cooling subsystem for cooling the device and having a first cooling subsystem rate of energy consumption,
  a second cooling subsystem for cooling the device and having a second cooling subsystem rate of energy consumption,
  the first cooling subsystem rate of energy consumption being lower than the second cooling subsystem rate of energy consumption,
  evaluation means comprising predictive evaluation means for providing a predictive output responsive to a determination whether a temperature of the device will exceed a first prescribed threshold value within a prescribed period of time, an evaluation output of the evaluation means being dependent on at least the predictive output of the predictive evaluation means,
  assessment means for providing an assessment output responsive to a determination whether the temperature of the device is lowerable by the first cooling subsystem alone, and
  control means for selectively controlling actuation of the first cooling subsystem or the second cooling subsystem in dependence on the evaluation output of the evaluation means and the assessment output of the assessment means.

In an aspect of the invention there is provided a vehicle comprising a device to be cooled, and a cooling system according to the preceding aspect or any embodiment thereof for cooling the said device.

In an aspect of the invention there is provided a controller for controlling a cooling system for cooling a device within a vehicle, wherein the cooling system comprises:
  a first cooling subsystem for cooling the device and having a first cooling subsystem rate of energy consumption, and
  a second cooling subsystem for cooling the device and having a second cooling subsystem rate of energy consumption,
  the first cooling subsystem rate of energy consumption being lower than the second cooling subsystem rate of energy consumption;
  wherein the controller comprises:
  evaluation means comprising predictive evaluation means for providing a predictive output responsive to a determination whether a temperature of the device will exceed a first prescribed threshold value within a prescribed period of time, an evaluation output of the evaluation means being dependent on at least the predictive output of the predictive evaluation means,
  assessment means for providing an assessment output responsive to a determination whether the temperature of the device is lowerable by the first cooling subsystem alone, and control means for selectively controlling actuation of the first cooling subsystem or the second cooling subsystem in dependence on the evaluation output of the evaluation means and the assessment output of the assessment means.

In an aspect of the invention there is provided a vehicle comprising a cooling system for cooling a device therewithin, and a controller according to the preceding aspect or any embodiment thereof for controlling the said cooling system.

In an aspect of the invention there is provided a method of controlling a cooling system for cooling a device within a vehicle, wherein the cooling system comprises:
 a first cooling subsystem for cooling the device and having a first cooling subsystem rate of energy consumption, and
 a second cooling subsystem for cooling the device and having a second cooling subsystem rate of energy consumption,
 the first cooling subsystem rate of energy consumption being lower than the second cooling subsystem rate of energy consumption;
 wherein the method comprises:
 determining by means of evaluation means comprising predictive evaluation means whether a temperature of the device will exceed a first prescribed threshold value within a prescribed period of time, in response to that determination generating a predictive output of the predictive evaluation means, and in dependence on at least the predictive output generating an evaluation output of the evaluation means;
 determining by means of assessment means whether the temperature of the device is lowerable by the first cooling subsystem alone, and in response to that determination generating an assessment output of the assessment means; and
 selectively controlling by means of control means actuation of the first cooling subsystem or the second cooling subsystem in dependence on the evaluation output of the evaluation means and the assessment output of the assessment means.

In an aspect of the invention there is provided a method of cooling a device within a vehicle by means of a cooling system, wherein the cooling system comprises:
 a first cooling subsystem for cooling the device and having a first cooling subsystem rate of energy consumption, and
 a second cooling subsystem for cooling the device and having a second cooling subsystem rate of energy consumption,
 the first cooling subsystem rate of energy consumption being lower than the second cooling subsystem rate of energy consumption;
 wherein the method comprises:
 determining by means of evaluation means comprising predictive evaluation means whether a temperature of the device will exceed a first prescribed threshold value within a prescribed period of time, in response to that determination generating a predictive output of the predictive evaluation means, and in dependence on at least the predictive output generating an evaluation output of the evaluation means;
 determining by means of assessment means whether the temperature of the device is lowerable by the first cooling subsystem alone, and in response to that determination generating an assessment output of the assessment means; and
 selectively controlling by means of control means actuation of the first cooling subsystem or the second cooling subsystem in dependence on the evaluation output of the evaluation means and the assessment output of the assessment means.

In some embodiments the predictive evaluation means may be operable to determine a predicted temperature indicative of the temperature of the device upon expiry of the prescribed period of time. The assessment means may be operable make said determination as to whether the temperature of the device is lowerable by the first cooling subsystem alone in dependence on said predicted temperature.

In some embodiments the assessment means may be operable make said determination as to whether the temperature of the device is lowerable by the first cooling subsystem alone in dependence on an ambient air temperature. The assessment means may be operable make said determination dependent on whether the ambient air outside the vehicle is lower than a desired device temperature.

Assessing whether a predicted temperature is lowerable by the first cooling subsystem alone provides advantages over assessments of whether current temperatures are lowerable by the first cooling subsystem alone, for example enabling use of lower energy-consuming solutions and ensuring little or no future use of the second cooling subsystem is required. The energy savings may translate into increases in vehicle efficiency and range.

In some embodiments of the invention the vehicle may be an electric vehicle, including an electrical propulsion motor and a charge storage device, such as a battery, which is the device to be cooled by the cooling system.

In some embodiments the electric vehicle may be a hybrid electric vehicle.

In other embodiments of the invention the vehicle may comprise an engine, such as an internal combustion engine, and at least one charge storage device which is the device to be cooled by the cooling system.

Furthermore it is to be understood that embodiments of the present invention are not necessarily limited to cooling systems for batteries or other charge storage devices, but they may be applied to various other devices within electric or non-electric vehicles which under normal operation may need cooling, for example certain items of electrical or mechanical equipment, or even an engine or motor itself.

In some embodiments of the present invention the first cooling subsystem rate of energy consumption and the second cooling subsystem rate of energy consumption may each independently be selected from a single (especially an approximate single) value of a respective rate of energy consumption, or a series or a plurality of such values, or one or more ranges of such values.

In some embodiments of the invention the evaluation means may further comprise reactive evaluation means for providing a reactive output responsive to a determination whether the temperature of the device already exceeds the first prescribed threshold value, the evaluation output of the evaluation means being dependent on the predictive output of the predictive evaluation means and the reactive output of the reactive evaluation means.

Such reactive evaluation means may for example comprise temperature sensing means, e.g. a conventional thermostat, and command means configured with reference to reference data and/or predictive data of optimum battery or other device temperatures in order to define the said first prescribed threshold value and generate the said evaluation output in dependence on whether that first prescribed threshold value has already been exceeded.

By use of such a reactive evaluation means an additional level of control may be achieved in which the cooling system may determine whether there is a current or immediate need for cooling of the device, by reference to its current or existing temperature.

In some embodiments of the invention the control means may be configured to selectively control actuation of the first cooling subsystem alone when the evaluation output of the evaluation means is such that it is determined that the temperature of the device will exceed a first prescribed threshold value within a prescribed period of time and the assessment output of the assessment means is such that it is determined that the temperature of the device is lowerable by the first cooling subsystem alone. In this manner, when it is determined that future cooling of the device is foreseen as necessary, it may be possible to apply pre-emptive cooling to the device by means of the first cooling subsystem alone, which represents a lower energy-consuming cooling solution.

In some embodiments of the invention the control means may be configured to selectively control actuation of the second cooling subsystem when the evaluation output of the evaluation means is such that it is determined that the temperature of the device will exceed a first prescribed threshold value within a prescribed period of time and the assessment output of the assessment means is such that it is determined that the temperature of the device is not lowerable by the first cooling subsystem alone. In this manner, when it is determined that future cooling of the device is foreseen as necessary, but it is determined that the lower energy-consuming cooling solution represented by the first cooling subsystem is not viable to effect the necessary cooling, then cooling may be effected by the second cooling subsystem (which may be alone or possibly in combination with the lower-energy first cooling subsystem), which although a higher energy-consuming solution, may nevertheless be desirable in this instance in order to effect the necessary cooling of the device.

In some embodiments of the invention the device to be cooled may have a target temperature and a temperature of a coolant or other cooling means in the first cooling subsystem is below the target temperature of the device.

In some embodiments of the invention the said temperature of the device to be cooled may be an internal operating temperature of the device. In the case of a battery or other charge storage device as the device to be cooled, alternatively or additionally the said temperature thereof may be an internal charging and/or operating temperature thereof.

In some embodiments of the invention the first and second cooling subsystems may each be of a different type from the other. The first cooling subsystem may operate with or at a relatively low rate of energy consumption, whilst the second cooling subsystem may operate with or at a relatively high rate of energy consumption.

According to some embodiments the first cooling subsystem may comprise a cooling apparatus which uses ambient air from outside the vehicle to cool the device. Such a cooling apparatus may comprise a conventional heat exchanger apparatus to transfer thermal energy from the device to the outside air for the purpose of cooling the device. Optionally the first cooling subsystem may comprise one or a plurality (e.g. in series or in parallel) of cooling apparatuses which each use ambient air, at an ambient temperature, to effect its cooling.

According to some embodiments the second cooling subsystem may comprise a refrigeration apparatus in thermal communication with the device to be cooled thereby. Such a refrigeration apparatus may comprise any suitable conventional refrigeration system or device. Optionally the second cooling subsystem may comprise one or a plurality (e.g. in series or in parallel) of cooling apparatuses which each use coolant, e.g. a liquid or gaseous coolant, at a temperature below the ambient temperature of ambient air outside the vehicle, to effect its cooling.

In some embodiments of the invention the evaluation means may comprise at least predictive evaluation means for providing a predictive output responsive to a determination whether a temperature of the device will exceed a first prescribed threshold value within a prescribed period of time. This determination may be performed on the basis of one or more of: (a) current temperature data of the device to be cooled, (b) historical temperature data obtained from one or more, especially a plurality of, past journeys or past travel undertaken by the vehicle, (c) forecast data concerning temperature conditions which may affect the device operating temperature, e.g. predicted weather conditions or predicted operating conditions of the vehicle, and/or (d) historical and/or forecast data concerning work rate which may affect the device operating temperature, e.g. historical and/or predicted work rate data indicative of how hard the device is being or is expected or predicted to be worked at least within the prescribed period of time. This determination may thus be thought of or expressed as a measure of the imminence or probability of the temperature of the device exceeding a first prescribed threshold value within a prescribed period of time being more than a prescribed probability value.

The said prescribed period of time may be expressed as a measurement defined in terms of absolute time itself, e.g. a number (especially an approximate number) of any one or more of seconds, minutes or hours. Alternatively it may be expressed as a determination by measurement, calculation or prediction of whether a temperature of the device will exceed the first prescribed threshold value within a time period needed to travel a prescribed distance.

Such a prescribed distance may be defined in terms of a distance between a current location of the vehicle and a reference location. Either or both of such current and/or reference vehicle locations may for example be determined by GPS (global positioning system) or satellite navigation data, or a cellular network location determining system. The predicted time to travel the said prescribed distance may further take into account one or more other driving parameters that may affect driving speed, e.g. reference data relating to known geographical features, speed limits, or known or detected road conditions which may place particular or special power or energy demands on the device to be cooled.

In some embodiments the prescribed period of time may be dependent on the identity of and/or the state of and/or current or predicted future energy demands of the battery or other device to be cooled. For example, the prescribed period of time may depend on a current or predicted demand for battery cooling, for example in dependence on a current rate of, or predicted, increase in battery temperature, for example arising from particular vehicle operational parameters such as current driving conditions, ambient temperature, driving terrain, driving mode (e.g. dependent on drive mode of a four-wheel drive, AWD or all-terrain vehicle), and power demand on the battery from other vehicle operational systems and subsystems. In this manner a prescribed period of time may be defined or set as being a maximum of a time period—which may in certain circumstances be zero seconds/minutes/hours if circumstances should dictate that—within which is predictively determined whether the first prescribed threshold value of the device temperature will be exceeded.

In some embodiments of the invention the assessment means may provide an assessment output responsive to a determination whether the temperature of the device is lowerable by the first cooling subsystem alone. The assessment means may thus determine whether or not the first cooling subsystem alone is capable of lowering a current or a predicted temperature of the device, and providing an assessment output accordingly. Such a cooling capability may be dictated for instance by a relative temperature difference between ambient air used as a coolant in the first cooling subsystem and the device itself.

If desired or appropriate, it may be arranged that only if such a temperature difference is greater than a predetermined amount, e.g. greater than about 0.5 or 1 or 1.5 or 2 degrees celsius, will such a cooling capability be deemed in the affirmative, and thus if such a temperature difference is less than a predetermined amount, e.g. less than about 0.5 or 1 or 1.5 or 2 degrees C., will such a cooling capability be deemed in the negative.

In some embodiments of the invention the control means may selectively control actuation of the first cooling subsystem or the second cooling subsystem in dependence on the evaluation output of the evaluation means and the assessment output of the assessment means. The control means may thus selectively control actuation of the first cooling subsystem or the second cooling subsystem in dependence on the evaluation output of the evaluation means and the assessment output of the assessment means in a manner of an OR gate.

Thus, if the evaluation output of the evaluation means (whether or not the predictive output of the predictive evaluation means alone or whether a sum of the predictive output of the predictive evaluation means and the reactive output of the reactive evaluation means) is positive, and the assessment output of the assessment means is also positive, then the control means may selectively control actuation of the first cooling subsystem alone to cool the device.

Alternatively, if the evaluation output of the evaluation means (whether or not the predictive output of the predictive evaluation means alone or whether a sum of the predictive output of the predictive evaluation means and the reactive output of the reactive evaluation means) is positive, and yet the assessment output of the assessment means is negative, then the control means may selectively control actuation of the second cooling subsystem alone to cool the device.

Such actuating of the second cooling subsystem alone may further be dependent on a level of energy availability from the device to be cooled or other energy source which is used to power the second cooling subsystem. Thus, if actuation of the second cooling subsystem is triggered by the control means, then if an overall energy demand of the device or an overall control system of the vehicle is such that it is not possible or desirable—e.g. for energy consumption or conservation reasons—to expend energy running the second cooling subsystem, then it may not be actuated by the control means, and cooling by the second cooling subsystem may not occur.

In some embodiments of the present invention at least the evaluation means, assessment means and control means of the cooling system or the controller, and the various determination and controlling operations in the various methods, may be constituted by elements of suitable software and/or electronics hardware. Such software and/or hardware may for example be provided by a dedicated control system or controller for the cooling system itself, or alternatively it may be provided as part of an overall operational control system of the vehicle.

Thus, in an aspect of the invention there is provided a computer readable medium carrying computer program code for controlling a cooling system for cooling a device within a vehicle to carry out a method as defined in any of the preceding method aspects of the invention or any embodiment thereof.

In an aspect of the invention there is provided a carrier medium carrying computer readable code for controlling a vehicle to carry out a method as defined in any of the preceding method aspects of the invention or any embodiment thereof.

In an aspect of the invention there is provided a computer program product executable on a processor so as to implement a method as defined in any of the preceding method aspects of the invention or any embodiment thereof.

In an aspect of the invention there is provided a computer readable medium loaded with a computer program product as defined in the preceding aspect or any embodiment thereof.

In an aspect of the invention there is provided a processor arranged to implement a method as defined in any of the preceding method aspects of the invention or any embodiment thereof, or a computer program product as defined in the above computer program product aspect or any embodiment thereof.

In an aspect of the invention there is provided a control system for controlling a cooling system for cooling a device within a vehicle, the cooling system comprising:
 a primary cooling apparatus for cooling the device whilst operating with a relatively low rate of energy consumption; and
 a secondary cooling apparatus for cooling the device whilst operating with a relatively high rate of energy consumption;
 wherein the control system comprises:
 an evaluator comprising a predictor for providing a predictive output responsive to a determination whether a probability of the temperature of the device exceeding a first prescribed threshold value within a prescribed period of time is above a probability threshold value, wherein an evaluation output of the evaluator is dependent on at least the predictive output of the predictor;
 an assessor for providing an assessment output responsive to a determination whether the temperature of the device is capable of being lowered by the primary cooling apparatus alone, and
 a controller for selectively controlling actuation of the primary cooling apparatus or the secondary cooling apparatus in dependence on the evaluation output of the evaluator and the assessment output of the assessor.

In embodiments, it may be that use is made of both the primary and secondary cooling apparatus together, where appropriate or necessary for fulfilling the functions of the vehicle and/or aiding the aims of prolonging battery life, enhancing battery efficiency, and so on.

Within the scope of this application it is expressly intended that the various aspects, embodiments, examples and alternatives set out in the preceding paragraphs, in the claims and/or in the following description and drawings, and in particular the individual features thereof, may be taken independently or in any combination. Features described with reference to one embodiment are applicable to all embodiments, unless expressly stated otherwise or such features are incompatible.

For the avoidance of doubt, it is to be understood that features described with respect to one aspect of the invention may be included within any other aspect of the invention, alone or in appropriate combination with one or more other features.

BRIEF DESCRIPTION OF THE DRAWINGS

Embodiments of the present invention in its various aspects will now be described in detail, by way of example only, with reference to the accompanying drawings, in which.

DETAILED DESCRIPTION OF EMBODIMENTS

Figure 1:
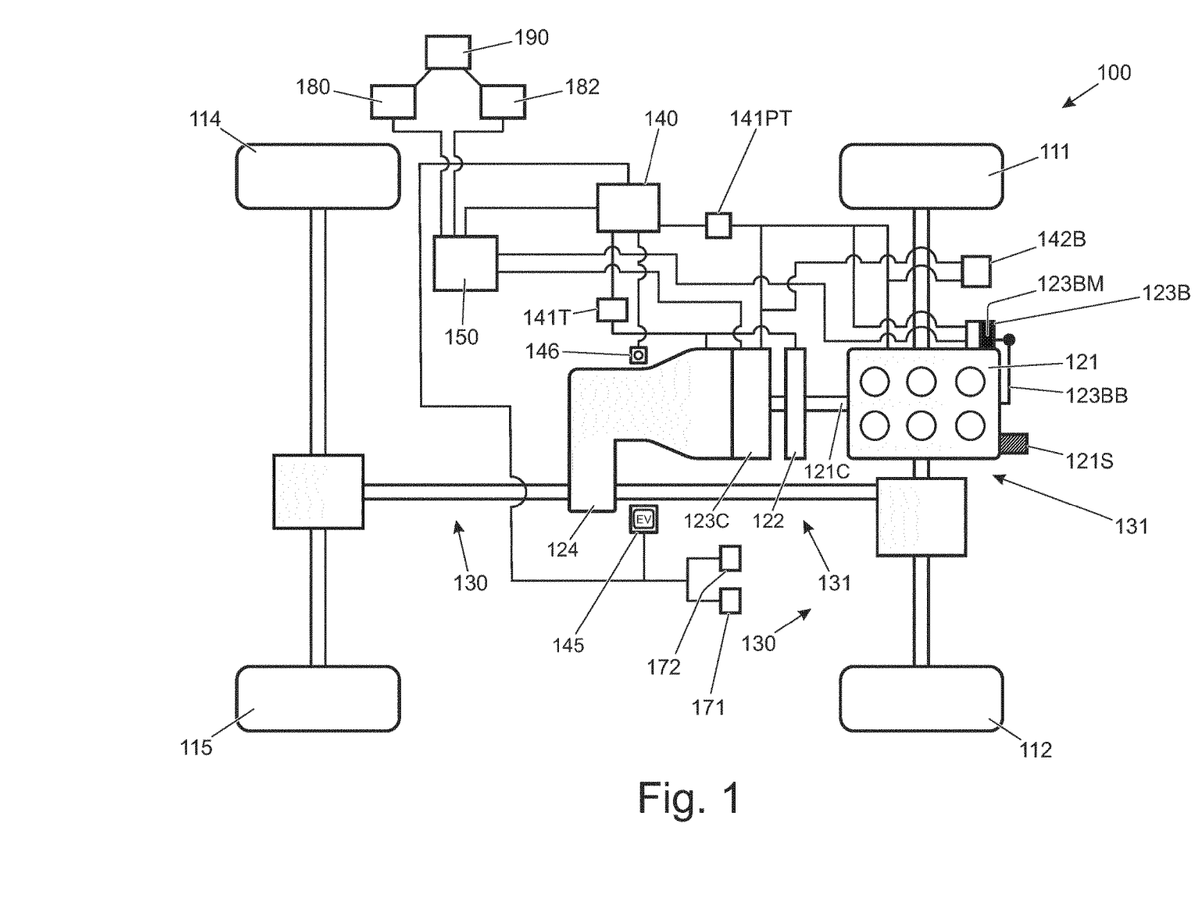
FIG. 1 is a schematic illustration of a hybrid electric vehicle including a cooling system for a battery according to an embodiment of the invention.

In one embodiment of the invention a hybrid electric vehicle 100 is provided as shown schematically in FIG. 1. The vehicle 100 has an engine 121 coupled to a belt integrated starter generator (BISG) 123B. The BISG 123B may also be referred to as a belt integrated (or belt mounted) motor generator and is operable to crank the engine 121 when starting is required. In addition or instead, a dedicated starter motor 121S may be provided. In some embodiments therefore, a BISG may be provided but a separate starter motor is employed for starting the engine 121. In some embodiments the BISG may be omitted.

The engine 121 is coupled in turn to a crankshaft-integrated starter/generator (CIMG) 123C by means of a crankshaft 121C and clutch 122. The clutch 122 may also be referred to as a K0 clutch 122. The CIMG 123C is also operable to crank the engine 121 when required.

The CIMG 123C is integrated into a housing of a transmission 124 which is in turn coupled to a driveline 130 of the vehicle 100 thereby to drive a pair of front wheels 111, 112 and a pair of rear wheels 114, 115 of the vehicle 100. The driveline 130 in combination with the transmission 124, CIMG 123C, clutch 122, engine 121 and BISG 123B may be considered to form part of a powertrain 131 of the vehicle 100. Wheels 111, 112, 114, 115 arranged to be driven by the driveline 130 may also be considered to form part of the powertrain 131. The transmission is controlled by means of a transmission controller 141T.

It is to be understood that other arrangements may also be useful. For example the driveline 130 may be arranged to drive the pair of front wheels 111, 112 only or the pair of rear wheels 114, 115 only, or to be switchable between a two wheel drive mode in which the front or rear wheels only are driven and a four wheel drive mode in which the front and rear wheels are driven.

The BISG 123B and CIMG 123C are arranged to be electrically coupled to a charge storage module 150 having a battery and an inverter. The module 150 is operable to supply the BISG 123B and/or CIMG 123C with electrical power when one or both are operated as propulsion motors.

Similarly, the module 150 may receive and store electrical power generated by the BISG 123B and/or CIMG 123C when one or both are operated as electrical generators. In some embodiments, the CIMG 123C and BISG 123B may be configured to generate different electrical potentials to one another. Accordingly, in some embodiments each is connected to a respective inverter adapted to operate at the corresponding potential of the CIMG 123C or BISG 123B. Each inverter may have a respective battery associated therewith. In some alternative embodiments the CIMG 123C and BISG 123B may be coupled to a single inverter which is adapted to receive charge from the CIMG 123C and BISG 123B at the respective potentials and to store the charge in a single battery. Other arrangements may also be useful.

As noted above, the BISG 123B has an electric machine 123BM that is drivably coupled to the crankshaft 121C of the engine 121 by means of a belt 123BB. The BISG 123B is operable to provide torque to the crankshaft 121C when it is required to start the engine 121 or when it is required to provide torque-assist to the driveline 130.

The vehicle 100 has a vehicle controller 140 operable to command a powertrain controller 141PT to control the engine 121 to switch on or off and to generate a required amount of torque. The vehicle controller 140 is also operable to command the powertrain controller 141PT to control the BISG 123B to apply a required value of positive or negative torque (operating as a propulsion motor or a generator) to the engine 121. Similarly, the vehicle controller 140 may command the CIMG 123C to apply a required value of positive or negative torque (again operating as a propulsion motor or a generator) to the driveline 130 via the transmission 124.

The vehicle has an accelerator pedal 171 and a brake pedal 172. The accelerator pedal 171 provides an output signal to the vehicle controller 140 indicative of an amount by which the pedal 171 is depressed. The vehicle controller 140 is arranged to determine the amount of driver demanded torque based on the accelerator pedal position and one or more other vehicle parameters including engine speed W. In some embodiments, the powertrain controller 141PT is arranged to receive the accelerator pedal position signal and calculate the amount of driver demanded torque.

The vehicle 100 of FIG. 1 is operable by the vehicle controller 140 in an electric vehicle (EV) mode in which the clutch 122 is open and the crankshaft 121C is stationary. In EV mode the CIMG 123C is operable to apply positive or negative torque to the driveline 130 via the transmission 124. Negative torque may be applied for example when regenerative braking is required under the control of a brake controller 142B.

The powertrain 131 is operable in one of a plurality of parallel modes in which the engine 121 is switched on and the clutch 122 is closed. The parallel modes include a "parallel boost" mode in which the CIMG 123C is operated as a motor to provide drive torque to the driveline 130 in addition to the torque provided by the engine 121. In the present embodiment the powertrain 131 is operated in the parallel boost configuration when the amount of driver demanded torque exceeds the maximum torque available from the engine 121. The amount of additional torque available from the CIMG 123C may be determined in dependence on the vehicle configuration as described in more detail below. It is to be understood that the feature of torque boost increases the available drive torque beyond that which is available from the engine 121 alone.

The parallel modes also include a parallel torque filling mode and a parallel torque assist mode. The parallel torque filling mode is a mode in which the CIMG 123C delivers drive torque to the driveline 130 in addition to the engine 121 in order to meet driver demand for torque more quickly than if the engine 121 alone delivers drive torque. Torque filling provides the benefit that driver torque demand may be satisfied more quickly, improving a responsiveness of the vehicle to an increase in torque demand.

In the present embodiment torque filling is implemented when a rate of increase of driver torque demand relative to the amount of torque delivered by the engine 121 exceeds a prescribed value. Once driver torque demand has been satisfied, the amount of torque delivered by the CIMG 123C decreases as the amount of torque delivered by the engine 121 increases to meet driver demand substantially entirely, without a requirement for additional torque from the CIMG 123C.

In the torque-assist parallel mode the CIMG 123C provides steady-state drive torque in addition to the engine 121 in order to relieve loading on the engine 121. This may assist in reducing fuel consumption. Torque-assist may be considered to be distinct from "torque filling", the latter being employed in a transient manner when an increase in drive torque is required.

The powertrain 131 may alternatively be operated in a parallel recharge mode in which the CIMG 123C is driven as a generator by the engine 121 to recharge the charge storage module 150.

The vehicle 100 has a hybrid mode selector control 145 in the form of a rotatable dial. The selector control 145 is operable to select one of three hybrid modes: an EV mode, a hybrid mode and a hybrid inhibit mode.

In the EV mode, the controller 140 causes the engine 121 to remain switched off whilst propulsion torque is delivered, as required, by means of the CIMG 123C only. Once the state of charge of the charge storage module 150 falls below a predetermined amount, for example below 10% of a maximum usable charge capacity, the controller 140 causes the engine 121 to be switched back on and the powertrain 131 to assume the parallel recharge mode until the state of charge exceeds a predetermined value, for example 25% of a maximum usable charge capacity.

In the hybrid mode, the controller 140 causes the powertrain 131 to assume a parallel mode or the EV mode in dependence on an energy management methodology implemented by the controller 140. Further details of energy management methodology may be found in GB2483371A. The controller 140 seeks to balance the use of charge stored in the charge storage device 150 to operate the CIMG 123C as a propulsion motor and the burning of fuel by the engine 121 in order to reduce emission of greenhouse gases such as carbon dioxide. Other energy management methodologies may also be useful.

In the hybrid inhibit mode, the controller 140 latches the engine 121 in the on condition and the K0 clutch 122 in the closed condition and causes the engine 121 to drive the transmission 124 substantially continually whilst the transmission 124 is in a driving mode in which drive torque may be delivered by the transmission 124 to the road wheels 111, 112, 114, 115.

The brake controller 142B is operable to cause a friction-based foundation braking system to cause braking of each of the road wheels 111, 112, 114, 115. The brake controller 142B is also operable to command the powertrain controller 141PT to cause the CIMG 123C to act as a generator and apply negative torque to the driveline 130 in order to cause braking. This may be referred to as regenerative braking since charge generated by the CIMG 123C in effecting braking may be stored in the charge storage module 150.

The vehicle 100 is also operable by the controller 140 in a selected one of a plurality of driving modes or control modes. In the present embodiment the driving modes are user-selected by means of a driving mode selector dial 146. In each driving mode each one of a plurality of vehicle subsystems are operated in a subsystem configuration mode appropriate to a given driving condition. The driving modes typically include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RC mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode) which is a suitable compromise mode, or general mode, for all terrain conditions and especially vehicle travel on motorways and regular roadways. The SPO mode may also be referred to as a highway mode. Many other control modes may also be envisaged including those disclosed in US2003/0200016A.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains. The driving modes may be referred to as "terrain response" or "TR"® modes.

The controller 140 commands vehicle subsystem controllers to assume a predetermined subsystem control mode in dependence on the selected driving mode. In the present embodiment the controller 140 commands the transmission controller 141T, powertrain controller 141PT and brake controller 142B to assume a predetermined subsystem control mode. In some embodiments other vehicle subsystems may have subsystem configuration modes commanded by the controller 140 such as a power steering control system (not shown), suspension control system such as an air suspension control system (not shown) and/or any other suitable subsystem.

The brake controller 142B may be arranged to provide relatively high brake force for a given amount of pressure applied to the brake pedal 163 or a relatively low brake force, depending on the driving mode. The brake controller 142B may also be arranged to allow different levels of wheel slip when an anti-lock braking system is active, for example relatively low amounts on low friction ("low-mu") surfaces and relatively large amounts on high friction ("high-mu") surfaces.

The powertrain controller 141PT may be operated in "quick" or "slow" accelerator (or throttle) pedal progression configuration modes in which an increase in engine torque as a function of accelerator pedal progression is relatively quick or slow, respectively. The rate may be dependent on speed in one or more modes such as Sand mode.

The transmission controller 141T may be operated in a "normal" mode that provides a reasonable compromise between fuel economy and driving performance, a "performance" mode which generally keeps the transmission in lower gears than in the normal mode, particularly when the driver is requesting a high level of driving torque to accelerate the vehicle, and a "manual" mode in which the control of gear changes is given completely to the driver. The transmission 124 also has a "snow" or "ice" mode which generally keeps the transmission 124 in higher gears than the normal mode, in particular under acceleration from rest, to avoid loss of traction due to wheel spin, and a "sand" mode which keeps the transmission in relatively high gears at low speed to avoid excessive wheel spin. Excessive wheel spin can result in the wheels digging themselves into the sand at low speeds. However, the sand mode uses relatively low gears at higher speeds where a relatively high degree of wheel slip can be desirable to provide maximum traction. Lower gearing also helps the engine 121 to remain in an operating region where the engine speed is high and the power output is high, thereby helping to avoid the vehicle 100 becoming "bogged down" by a lack of power.

The vehicle 100 further includes a cooling system according to an embodiment of the present invention, which embodiment cooling system comprises two independently actuatable cooling subsystems 180, 182 for the charge storage module 150 itself, or at least the battery (e.g. a HV battery) component thereof, and a controller 190 for controlling operation of the battery cooling subsystems 180, 182.

The first cooling subsystem 180 is a relatively low energy-consuming cooling apparatus, in particular one that uses ambient air from outside the vehicle 100 to cool the battery 150. This lower-energy cooling apparatus 180 may comprise one or more conventional ambient air-based heat exchangers or other cooling devices which employ natural or forced airflow in thermal communication with the battery 150 to extract heat energy therefrom, e.g. in the same or like manner to many known types of conventional vehicle radiators or other air-cooled machines.

The second cooling subsystem 182 is a relatively high energy-consuming cooling apparatus, in particular one that employs a refrigeration system to effect cooling, i.e. one that employs a refrigerant-type coolant (e.g. a liquid or gaseous coolant) having a temperature lower than that of ambient air outside the vehicle. This higher-energy cooling apparatus 182 may comprise one or more conventional refrigerant-based heat exchangers or other cooling devices, e.g. of the same or similar general type as conventional air conditioning systems, refrigeration devices or other cooling devices employing sub-ambient coolants in thermal communication with the battery to be cooled thereby.

The cooling apparatuses 180, 182 may themselves be powered from the charge storage module 150 itself, as shown, or they may be powered from another source within the vehicle.

With many modern types of battery used in the charge storage module 150, it may often be desirable that a battery operating temperature is carefully controlled so as to be at an optimum working temperature under typical vehicle operational conditions, which may vary over time or with various vehicle operational parameters, such as weather, driving conditions, state of charge (SOC) of the battery, and especially power demands made of the charge storage module 150 by various other control or operational systems of the vehicle.

Figure 2:
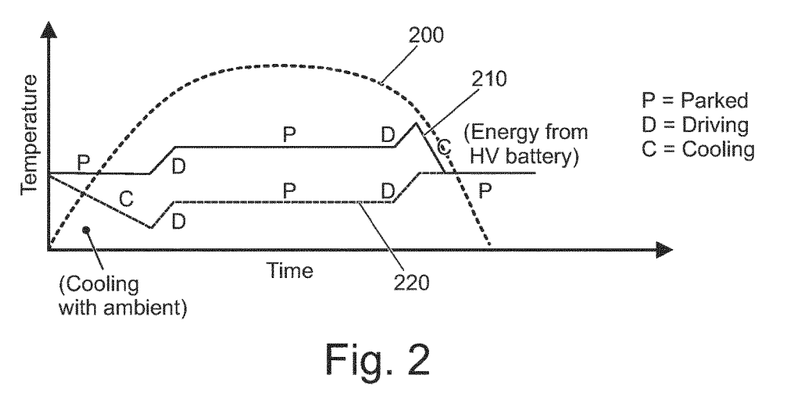
FIG. 2 is a comparative graph illustrating various typical daily temperature profiles of a battery of a hybrid electric vehicle, both using and in the absence of the embodiment cooling system used in the vehicle of FIG. 1.

FIG. 2 shows an example of a typical daily temperature profile of a battery 150 in various scenarios, both using and without use of a cooling system according to an embodiment of the present invention. This graph illustrates a typical timespan of a period of e.g. 24 hours, from midnight-to-midnight, during everyday usage of the vehicle:

The curved dotted line plot 200 represents a typical daily ambient temperature profile of the environment in which the vehicle is situated.

The solid line plot 210 represents a typical variation of internal temperature of the battery 150 itself when used in conjunction with known battery cooling systems which cool it solely reactively, over exemplary periods of driving (D), being parked (P) (i.e. the vehicle stationary with the motor/engine switched off and onboard systems powered down as far as possible), and undergoing cooling (C). This solid line plot 210 is thus representative of an amount of latent heat energy within the battery that needs to be managed and controlled within an optimum range, in accordance with aims of some embodiments of the invention.

Figure 3:
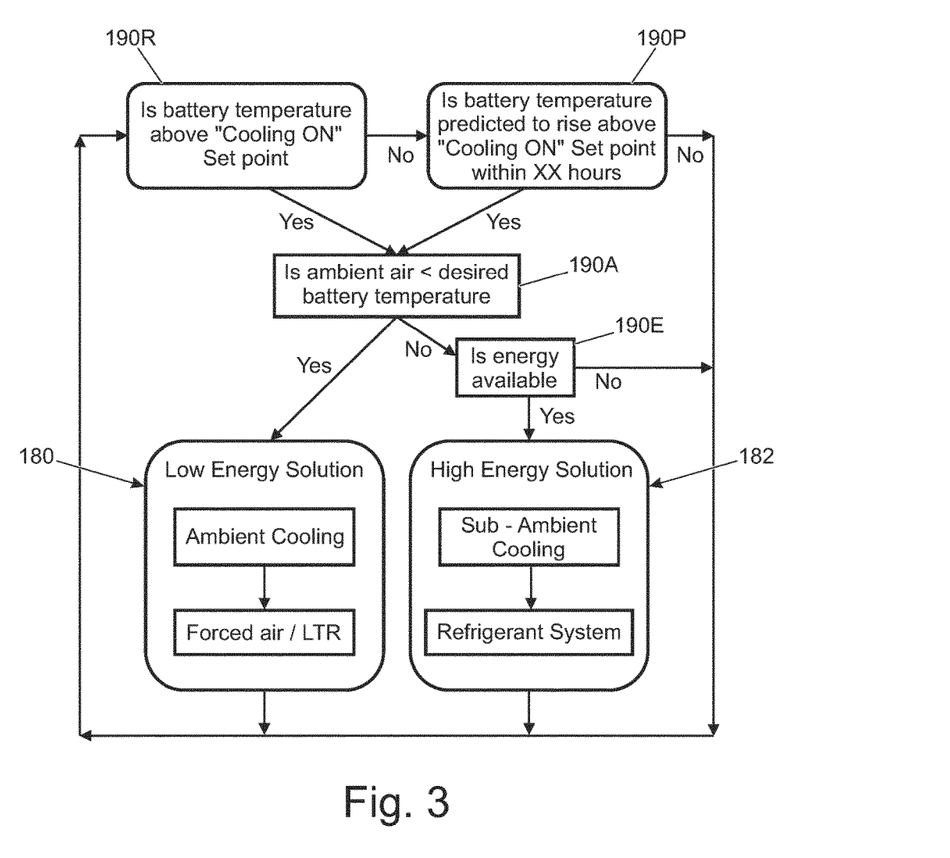
FIG. 3 is a schematic flow diagram illustrating the general method of operation of the embodiment cooling system in the vehicle of FIG. 1.

The dashed line plot 220 represents a typical variation of internal temperature of the battery 150 when used in conjunction with a cooling system according to an embodiment of the present invention, using the methodology as illustrated by FIG. 3.

The manner of operation of the controller 190 is illustrated schematically in FIG. 3. As part of an overall evaluation means, a conventional thermostat-based evaluation device (not shown) may be used to constitute a reactive evaluator 190R, which is a constituent element of the overall controller 190. The reactive evaluator 190R makes an initial determination of whether the battery temperature is currently above or has already exceeded a predetermined threshold value, such that immediate cooling thereof is necessary or at least highly desirable, and generates a reactive output accordingly.

The other constituent element of the evaluation means is a predictive evaluator 190P, which makes an assessment of whether the battery temperature is likely to exceed the prescribed threshold value within a certain period of time, and generates a predictive output accordingly. This predictive assessment of future battery temperature may be carried out at least on the basis of historical battery temperature data, e.g. derived from a plurality of past or previous journeys undertaken by the vehicle and monitored for battery temperature with reference to parameters including for example any one or more of the following: vehicle location data (such as GPS- or satellite navigation system-derived current location and/or reference location data defined by historical location data), driving speed, reference data relating to known geographical features, driving routes, speed limits, known or detected road conditions which may place particular or special power or energy demands on the battery, battery state of charge (SOC), external ambient air temperature or other climatic conditions, and a predicted journey start time.

This predictive assessment of future battery temperature may be carried out additionally or alternatively on the basis of forecasted climate or other data, e.g. from weather data or even manually input data relating to parameters (such as any of the aforementioned) of an upcoming journey.

This predictive assessment of future battery temperature may be carried out additionally or alternatively on the basis of historical and/or forecast data concerning work rate which may affect the battery operating temperature, e.g. historical and/or predicted work rate data indicative of how hard the battery is being or is expected or predicted to be worked at least within the aforementioned certain period of time. An example of this predictive assessment criterion may be a predictive assessment of a particular driving style, e.g. indicative of a particular driver, which may be independent of any other criteria of this predictive assessment.

An assessment means 190A, which may also be a constituent element of the overall controller 190, then (e.g. subsequently or simultaneously, although it could be performed previously to the predictive evaluation step) makes a determination as to whether the low-energy cooling subsystem alone is appropriate or possible for achieving the required cooling, on the basis of whether the ambient air outside the vehicle is sufficiently (e.g. at least 1 or 2 degrees C., for example) below the temperature of the battery. If the output of that step is in the affirmative, then cooling of the battery by the low-energy cooling apparatus 180 is initiated, whereas if the output of that step is in the negative, then cooling of the battery by the high-energy cooling apparatus 182 is initiated instead.

A useful additional constituent element of the controller 190 may be a checking means 190E which checks to ensure that the overall energy level of the battery 150, e.g. as defined by its state of charge (SOC), is sufficient to power the high-energy cooling apparatus 182, as FIG. 3 further illustrates.

As one example of the above methodology: for example when the vehicle 100 is parked at a driver's home location overnight, it may be determined by the reactive evaluator 190R that there is no immediate need for cooling of the battery 150. However, it may be expected—as determined by the predictive evaluator 190P—that within a certain number of hours (e.g. in the morning, when the vehicle may typically be driven again) the battery temperature will be expected to rise significantly, such that cooling will be required during the upcoming daytime. Thus, by operating the low-energy ambient air-based cooling apparatus 180 during the night, provided that it has been determined by the assessor 190A that the low-energy ambient-air based cooling apparatus 180 is indeed appropriate in light of the temperature of the ambient air in comparison with the battery temperature, the battery temperature can be pre-emptively lowered using the relatively low-energy cooling solution 180 alone, such that come the daytime no or little active battery cooling by the relatively high-energy cooling solution 182 may be necessary.

The above procedure may be especially useful, since ambient air during the night may typically be below the current—and often also a target—temperature of the battery 150, thereby making the use of the low-energy cooling apparatus 180 even more attractive as an energy-efficient solution to cooling the battery 150 pre-emptively using as low an energy-consuming solution as possible.

By use of this "intelligent" battery cooling system, controller therefor, and method, and pre-emptively using a lower-energy cooling subsystem in preference to a higher-energy cooling subsystem where that is possible, overall energy consumption of the cooling system and its various components may be reduced, thereby leading to less battery drain, lower levels of recharging that are required, possibly extending the life of the battery, and generally more energy- and environmentally-efficient battery and vehicle control system performance. It may also help to increase the vehicle's fuel economy and electric range.

In one embodiment of the invention, the step of checking "is energy available?", as illustrated in FIG. 3, may refer to the checking means 190E checking if energy is available from a suitable energy source, i.e. checking that the battery is charging. For example, if the battery is plugged in and charging, the checking means 190E may determine that energy is available to power the high-energy cooling apparatus 182. In this example the checking means 190E may take into account the energy tariff associated with charging, for example by comparing the time of day with electricity price variations, which may be daily variations. For example, if the battery is plugged in and charging, the checking means 190E may determine that energy is available to power the high-energy cooling apparatus during the night when an electricity tariff is cheaper.

Although the above embodiments have been described with reference to a hybrid electric vehicle and a battery therefor, it is to be understood that the embodiments may be applied to other types of vehicle, e.g. other types of electric vehicle or even conventional vehicles having an internal combustion engine and one or more on-board powered devices that may itself/themselves require cooling in order to be maintained at optimum temperatures.

It is to be understood that the above description of embodiments and aspects of the invention has been by way of non-limiting examples only, and various modifications may be made from what has been specifically described and illustrated whilst remaining within the scope of the invention as defined in the appended claims.

Some embodiments of the present invention may be understood by reference to the following numbered paragraphs:

1. A cooling system for cooling a device within a vehicle, the cooling system comprising:
   a first cooling subsystem for cooling the device and having a first cooling subsystem rate of energy consumption,
   a second cooling subsystem for cooling the device and having a second cooling subsystem rate of energy consumption,
   the first cooling subsystem rate of energy consumption being lower than the second cooling subsystem rate of energy consumption,
   an evaluator comprising a predictive evaluator arranged to provide a predictive output responsive to a determination whether a temperature of the device will exceed a first prescribed threshold value within a prescribed period of time, an evaluation output of the evaluator being dependent on at least the predictive output of the predictive evaluator,
   an assessor arranged to provide an assessment output responsive to a determination whether the temperature of the device is lowerable by the first cooling subsystem alone, and
   a controller arranged to selectively control actuation of the first cooling subsystem or the second cooling subsystem in dependence on the evaluation output of the evaluator and the assessment output of the assessor.

2. A cooling system according to Paragraph 1, wherein the vehicle is an electric vehicle, including an electrical propulsion motor and a charge storage device which is the device to be cooled by the cooling system.

3. A cooling system according to Paragraph 2, wherein the electric vehicle is a hybrid electric vehicle.

4. A cooling system according to Paragraph 1, wherein the vehicle comprises an engine and at least one charge storage device which is the device to be cooled by the cooling system.

5. A cooling system according to any preceding Paragraph, wherein the evaluator further comprises a reactive evaluator arranged to provide a reactive output responsive to a determination whether the temperature of the device already exceeds the first prescribed threshold value, the evaluation output of the evaluator being dependent on the predictive output of the predictive evaluator and the reactive output of the reactive evaluator.

6. A cooling system according to Paragraph 5, wherein the reactive evaluator comprises a temperature sensor and a commander configured with reference to reference data and/or predictive data of device temperatures in order to define the said first prescribed threshold value and generate the said evaluation output in dependence on whether that first prescribed threshold value has already been exceeded.

7. A cooling system according to any preceding Paragraph, wherein the controller is arranged to selectively control actuation of the first cooling subsystem alone when the evaluation output of the evaluator is such that it is determined that the temperature of the device will exceed a first prescribed threshold value within a prescribed period of time and the assessment output of the assessor is such that it is determined that the temperature of the device is lowerable by the first cooling subsystem alone.

8. A cooling system according to any preceding Paragraph, wherein the controller is arranged to selectively control actuation of the second cooling subsystem when the evaluation output of the evaluator is such that it is determined that the temperature of the device will exceed a first prescribed threshold value within a prescribed period of time and the assessment output of the assessor is such that it is determined that the temperature of the device is not lowerable by the first cooling subsystem alone.

9. A cooling system according to any preceding Paragraph, wherein the device to be cooled has a target temperature and a temperature of a coolant or cooling means in the first cooling subsystem is below the target temperature of the device.

10. A cooling system according to any preceding Paragraph, wherein the said temperature of the device to be cooled is an internal operating temperature of the device.

11. A cooling system according to Paragraph 10, wherein the device to be cooled is a charge storage device and the said temperature thereof is an internal charging and/or operating temperature thereof.

12. A cooling system according to any preceding Paragraph, wherein the first cooling subsystem operates with or at a relatively low rate of energy consumption, and the second cooling subsystem operates with or at a relatively high rate of energy consumption.

13. A cooling system according to any preceding Paragraph, wherein the first cooling subsystem comprises a cooling apparatus which uses ambient air from outside the vehicle to cool the device.

14. A cooling system according to any preceding Paragraph, wherein the second cooling subsystem comprises a refrigeration apparatus in thermal communication with the device to be cooled thereby.

15. A cooling system according to any preceding Paragraph, wherein the determination carried out by the evaluator is performed on the basis of one or more of: (a) current temperature data of the device to be cooled, (b) historical temperature data obtained from one or more past journeys or past travel undertaken by the vehicle, (c) forecast data concerning temperature conditions which may affect the device operating temperature, and/or (d) historical and/or forecast data concerning work rate which may affect the device operating temperature.

16. A cooling system according to any preceding Paragraph, wherein the said prescribed period of time is expressed as a measurement defined in terms of absolute time itself, or is expressed as a determination by measurement, calculation or prediction of whether a temperature of the device will exceed the first prescribed threshold value within a time period needed to travel a prescribed distance.

17. A cooling system according to Paragraph 16, wherein the prescribed distance is defined in terms of a distance between a current location of the vehicle and a reference location.

18. A cooling system according to any preceding Paragraph, wherein the prescribed period of time is dependent on the identity of and/or the state of and/or current or predicted future energy demands of the device to be cooled.

19. A cooling system according to any preceding Paragraph, wherein the assessor is arranged to provide an assessment output responsive to a determination whether or not the first cooling subsystem alone is capable of lowering a current or predicted temperature of the device, and providing an assessment output dependent thereon, the said cooling capability being dictated by a relative temperature difference between a coolant of the first cooling subsystem and the device to be cooled.

20. A cooling system according to Paragraph 19, wherein the assessor is arranged such that only if a said temperature difference is greater than a predetermined amount is the said cooling capability deemed in the affirmative, and if a said temperature difference is less than the said predetermined amount is the said cooling capability deemed in the negative.

21. A cooling system according to any preceding Paragraph, wherein the controller is arranged to selectively control actuation of the first cooling subsystem or the second cooling subsystem in dependence on the evaluation output of the evaluator and the assessment output of the assessor in a manner of an OR gate.

22. A cooling system according to Paragraph 21, wherein if the evaluation output of the evaluator is positive, and the assessment output of the assessor is also positive, then the controller selectively controls actuation of the first cooling subsystem alone to cool the device.

23. A cooling system according to Paragraph 21, wherein if the evaluation output of the evaluator is positive, and yet the assessment output of the assessor is negative, then the controller selectively controls actuation of the second cooling subsystem alone to cool the device.

24. A cooling system according to Paragraph 23, wherein the said actuating of the second cooling subsystem alone is further dependent on a level of energy availability from the device to be cooled or other energy source which is used to power the second cooling subsystem.

25. A control system for controlling a cooling system for cooling a device within a vehicle, wherein the cooling system comprises:
a first cooling subsystem for cooling the device and having a first cooling subsystem rate of energy consumption, and
a second cooling subsystem for cooling the device and having a second cooling subsystem rate of energy consumption,
the first cooling subsystem rate of energy consumption being lower than the second cooling subsystem rate of energy consumption;
wherein the control system comprises:
an evaluator comprising a predictive evaluator arranged to provide a predictive output responsive to a determination whether a temperature of the device will exceed a first prescribed threshold value within a prescribed period of time, an evaluation output of the evaluator being dependent on at least the predictive output of the predictive evaluator,
an assessor arranged to provide an assessment output responsive to a determination whether the temperature of the device is lowerable by the first cooling subsystem alone, and
a controller arranged to selectively control actuation of the first cooling subsystem or the second cooling subsystem in dependence on the evaluation output of the evaluator and the assessment output of the assessor.

26. A control system according to Paragraph 25, wherein the device to be cooled is a charge storage device of a vehicle, especially of an electric or hybrid electric vehicle.

27. A vehicle comprising a device to be cooled, and a cooling system according to any one of Paragraphs 1 to 24 for cooling the device.

28. A vehicle comprising a cooling system according to any one of Paragraphs 1 to 24 for cooling a device within the vehicle, and a control system according to Paragraph 25 or Paragraph 26 for controlling the said cooling system.

29. A vehicle comprising a body, a plurality of wheels, a powertrain to drive said wheels, a braking system to brake said wheels, and a cooling system according to any one of Paragraphs 1 to 24 or a control system according to Paragraph 25 or Paragraph 27.

30. A method of controlling a cooling system for cooling a device within a vehicle, wherein the cooling system comprises:
   a first cooling subsystem for cooling the device and having a first cooling subsystem rate of energy consumption, and
   a second cooling subsystem for cooling the device and having a second cooling subsystem rate of energy consumption,
   the first cooling subsystem rate of energy consumption being lower than the second cooling subsystem rate of energy consumption;
   wherein the method comprises:
   determining by means of an evaluator comprising a predictive evaluator whether a temperature of the device will exceed a first prescribed threshold value within a prescribed period of time, in response to that determination generating a predictive output of the predictive evaluator, and in dependence on at least the predictive output generating an evaluation output of the evaluator;
   determining by means of an assessor whether the temperature of the device is lowerable by the first cooling subsystem alone, and in response to that determination generating an assessment output of the assessor; and
   selectively controlling by means of a controller actuation of the first cooling subsystem or the second cooling subsystem in dependence on the evaluation output of the evaluator and the assessment output of the assessor.

31. A method of cooling a device within a vehicle by means of a cooling system, wherein the cooling system comprises:
   a first cooling subsystem for cooling the device and having a first cooling subsystem rate of energy consumption, and
   a second cooling subsystem for cooling the device and having a second cooling subsystem rate of energy consumption,
   the first cooling subsystem rate of energy consumption being lower than the second cooling subsystem rate of energy consumption;
   wherein the method comprises:
   determining by means of an evaluator comprising a predictive evaluator whether a temperature of the device will exceed a first prescribed threshold value within a prescribed period of time, in response to that determination generating a predictive output of the predictive evaluator, and in dependence on at least the predictive output generating an evaluation output of the evaluator;
   determining by means of an assessor whether the temperature of the device is lowerable by the first cooling subsystem alone, and in response to that determination generating an assessment output of the assessor; and
   selectively controlling by means of a controller actuation of the first cooling subsystem or the second cooling subsystem in dependence on the evaluation output of the evaluator and the assessment output of the assessor.

32. A computer readable medium carrying computer program code for controlling a vehicle to carry out a method according to Paragraph 30 or Paragraph 31.

33. A carrier medium carrying computer readable code for controlling a vehicle to carry out a method according to Paragraph 30 or Paragraph 31.

34. A computer program product executable on a processor so as to implement a method according to Paragraph 30 or Paragraph 31.

35. A computer readable medium loaded with a computer program product according to Paragraph 34.

36. A processor arranged to implement a method according to Paragraph 30 or Paragraph 31, or a computer program product according to Paragraph 34.

Throughout the description and claims of this specification, the words "comprise" and "contain" and variations of those words, for example "comprising" and "comprises", mean "including but not limited to", and are not intended to (and do not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:
1. A cooling system configured to cool a charge storage device within a vehicle, the cooling system comprising:
   a first cooling subsystem for cooling the charge storage device and having a first cooling subsystem rate of energy consumption,
   a second cooling subsystem for cooling the charge storage device and having a second cooling subsystem rate of energy consumption,
   the first cooling subsystem rate of energy consumption being lower than the second cooling subsystem rate of energy consumption,
   an evaluator comprising a predictive evaluator configured to provide a predictive output responsive to a first determination, the first determination being whether a temperature of the charge storage device will exceed a first prescribed threshold value within a prescribed period of vehicle driving time, an evaluation output of the evaluator being dependent on at least the predictive output,
   an assessor configured to provide an assessment output responsive to a second determination, the second determination being whether the temperature of the charge storage device is lowerable by the first cooling subsystem alone, and a controller configured to:
- select the first cooling subsystem or the second cooling subsystem as an operational cooling subsystem in dependence on the assessment output; and
- control actuation of the operational cooling subsystem pre-emptively before the temperature of the charge storage device exceeds the first prescribed threshold value according to the first determination, in order to lower the temperature of the charge storage device in dependence on the evaluation output.

2. A cooling system according to claim 1, wherein the predictive evaluator is operable to determine a predicted temperature indicative of the temperature of the charge storage device upon expiry of the prescribed period of vehicle driving time.

3. A cooling system according to claim 2, wherein the assessor is operable to make said second determination whether the temperature of the charge storage device is lowerable by the first cooling subsystem alone in dependence on said predicted temperature or an ambient air temperature or whether ambient air outside the vehicle is lower than a desired charge storage device temperature.

4. A cooling system according to claim 1, wherein the vehicle includes the charge storage device and one of an electrical propulsion motor and an engine.

5. A cooling system according to claim 1, wherein
the evaluator further comprises a reactive evaluator configured to provide a reactive output responsive to a determination whether the temperature of the charge storage device already exceeds the first prescribed threshold value, and
the evaluation output is dependent on the predictive output and the reactive output.

6. The cooling system according to claim 5, wherein the reactive evaluator comprises a temperature sensor and a commander configured with reference to at least one of reference data and predictive data of device temperatures in order to define the first prescribed threshold value and generate the evaluation output in dependence on whether the defined first prescribed threshold value has already been exceeded.

7. A cooling system according to claim 1, wherein the controller is configured to selectively control actuation of at least one of the first cooling subsystem and the second cooling subsystem when the evaluation output is such that it is determined that the temperature of the charge storage device will exceed the first prescribed threshold value within the prescribed period of vehicle driving time and the assessment output is such that it is determined that the temperature of the charge storage device is lowerable by the first cooling subsystem alone.

8. A cooling system according to claim 1, wherein the charge storage device to be cooled has a target temperature and a temperature of a coolant or cooling device in the first cooling subsystem is below the target temperature of the charge storage device.

9. A cooling system according to claim 1, wherein the temperature of the charge storage device to be cooled is at least one of an internal charging and internal operating temperature of the charge storage device.

10. A cooling system according to claim 1, wherein the first cooling subsystem comprises a cooling apparatus which uses ambient air from outside the vehicle to cool the charge storage device and the second cooling subsystem comprises a refrigeration apparatus in thermal communication with the charge storage device.

11. A cooling system according to claim 1, wherein the first determination is performed on the basis of one or more of: (a) current temperature data of the charge storage device to be cooled, (b) historical temperature data obtained from one or more past journeys or past travel undertaken by the vehicle, (c) forecast data concerning temperature conditions which may affect the temperature of the charge storage device, and (d) at least one of historical and forecast data concerning a work rate which may affect the temperature of the charge storage device.

12. A cooling system according to claim 1, wherein the prescribed period of vehicle driving time is expressed as a measurement defined in terms of absolute time itself, or is expressed as a determination by measurement, calculation or prediction of whether the temperature of the charge storage device will exceed the first prescribed threshold value within a time period needed to travel a prescribed distance.

13. A cooling system according to claim 1, wherein the prescribed period of vehicle driving time is dependent on at least one of an identity of, a state of, current energy demands of, and predicted future energy demands of the charge storage device.

14. A cooling system according to claim 1, wherein the assessor is configured to provide the assessment output dependent on a determination whether a cooling capability of the first cooling subsystem alone is capable of lowering a current or predicted temperature of the charge storage device, the cooling capability being dictated by a relative temperature difference between a coolant of the first cooling subsystem and the charge storage device.

15. A cooling system according to claim 1, wherein the controller selectively controls actuation of the first cooling subsystem or the second cooling subsystem in dependence on the evaluation output and the assessment output in a manner of an OR gate.

16. A cooling system according to claim 15, wherein if the evaluation output is positive, and the assessment output is also positive, then the controller selectively controls actuation of the first cooling subsystem alone to cool the charge storage device, or, if the evaluation output is positive, and the assessment output is negative, then the controller selectively controls actuation of the second cooling subsystem alone to cool the charge storage device.

17. A vehicle comprising a charge storage device to be cooled, and a cooling system according to claim 1 for cooling the charge storage device.

18. A controller configured to control a cooling system for cooling a charge storage device within a vehicle, wherein the cooling system comprises:
- a first cooling subsystem for cooling the charge storage device and having a first cooling subsystem rate of energy consumption, and
- a second cooling subsystem for cooling the charge storage device and having a second cooling subsystem rate of energy consumption,
- the first cooling subsystem rate of energy consumption being lower than the second cooling subsystem rate of energy consumption;
- wherein the controller comprises:
- an evaluator comprising a predictive evaluator configured to provide a predictive output responsive to a first determination, the first determination being whether a temperature of the charge storage device will exceed a first prescribed threshold value within a prescribed period of time, an evaluation output of the evaluator being dependent on at least the predictive output, an assessor configured to provide an assessment output responsive to a second determination, the second determination being whether the temperature of the charge storage device is lowerable by the first cooling subsystem alone, and wherein the controller is configured to selectively control actuation of the first cooling subsystem or the second cooling subsystem pre-emptively before the temperature of the charge storage device exceeds the first prescribed threshold value according to the first determination in dependence on the evaluation output, wherein the evaluation output is dependent on at least the predictive output and the assessment output.

19. A controller according to claim 18, wherein the predictive evaluator is operable to determine a predicted temperature indicative of the temperature of the charge storage device upon expiry of the prescribed period of time.

20. A controller according to claim 19, wherein the assessor is operable to make said second determination whether the temperature of the charge storage device is lowerable by the first cooling subsystem alone in dependence on said predicted temperature or an ambient air temperature or whether ambient air outside the vehicle is lower than a desired charge storage device temperature.

21. A method of cooling a charge storage device within a vehicle by a cooling system, wherein the cooling system comprises:

a first cooling subsystem for cooling the charge storage device and having a first cooling subsystem rate of energy consumption, and a second cooling subsystem for cooling the charge storage device and having a second cooling subsystem rate of energy consumption, the first cooling subsystem rate of energy consumption being lower than the second cooling subsystem rate of energy consumption;

the method comprising:

determining, by an evaluator comprising a predictive evaluator, whether a temperature of the charge storage device will exceed a first prescribed threshold value within a prescribed period of vehicle driving time and generating a corresponding predictive output;

in dependence on at least the predictive output, generating an evaluation output;

determining, by an assessor, whether the temperature of the charge storage device is lowerable by the first cooling subsystem alone, and generating a corresponding assessment output;

selecting the first cooling subsystem or the second cooling subsystem as an operational cooling subsystem in dependence on the assessment output; and controlling actuation of the operational cooling subsystem in order to lower a temperature of the charge storage device in dependence on the evaluation output.

22. A non-transitory computer readable medium containing computer program code for controlling a vehicle to carry out a method according to claim 21.

* * * * *